US012449747B2

(12) United States Patent
Ueno et al.

(10) Patent No.: US 12,449,747 B2
(45) Date of Patent: Oct. 21, 2025

(54) DEVELOPING DEVICE AND IMAGE FORMING APPARATUS THEREWITH

(71) Applicant: KYOCERA Document Solutions Inc., Osaka (JP)

(72) Inventors: Masahiro Ueno, Osaka (JP); Hirofumi Tsuji, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/599,732

(22) Filed: Mar. 8, 2024

(65) Prior Publication Data

US 2024/0310756 A1 Sep. 19, 2024

(30) Foreign Application Priority Data

Mar. 15, 2023 (JP) ................................ 2023-040523

(51) Int. Cl.
*G03G 15/08* (2006.01)

(52) U.S. Cl.
CPC . *G03G 15/0889* (2013.01); *G03G 2215/0822* (2013.01); *G03G 2215/0827* (2013.01); *G03G 2215/085* (2013.01)

(58) Field of Classification Search
CPC ........... G03G 15/0865; G03G 15/0867; G03G 15/0889; G03G 2215/0822
See application file for complete search history.

(56) References Cited

U.S. PATENT DOCUMENTS

2020/0264535 A1* 8/2020 Hashimoto ........ G03G 15/0865

FOREIGN PATENT DOCUMENTS

JP 2020-134692 A 8/2020

* cited by examiner

*Primary Examiner* — Hoang X Ngo
(74) *Attorney, Agent, or Firm* — Stein IP, LLC

(57) ABSTRACT

A developing device includes a developer container, a developer carrier, and a stirring/conveying member. The developer container includes: a lower housing having a first accommodating portion and a first edge portion formed in a top end portion of it; and an upper housing having a second accommodating portion and a second edge portion formed in a bottom end portion of it. The first edge portion has a depression extending along the first edge portion, a first contact face formed inward of the depression, and a first opposite face formed outward of the depression. The second edge portion has an elevation inserted in the depression, a second contact face making contact with the first contact face, and a second opposite face facing the first opposite face. When the first and second contact faces are in contact, the first and second opposite faces face each other across a predetermined interval.

7 Claims, 6 Drawing Sheets

DEVELOPING DEVICE AND IMAGE FORMING APPARATUS THEREWITH

INCORPORATION BY REFERENCE

This application is based upon and claims the benefit of priority from the corresponding Japanese Patent Application No. 2023-040523 filed on Mar. 15, 2023, the entire contents of which are hereby incorporated by reference.

BACKGROUND

The present disclosure relates to a developing device that stores developer containing toner and that develops latent images using the toner, and to an image forming apparatuses incorporating such a developing device.

Known developing devices used in image forming apparatuses employing electrophotography, such as copiers, printers, facsimile machines, and multifunction peripherals incorporating their functions, include those of a two-component development system that use a two-component developer containing toner and carrier, and those of a one-component development system that use a one-component developer containing toner alone. A developer container for storing developer is generally structured to include a lower housing that is open at the top and an upper housing (cover portion) that seals the opening in the lower housing. The upper housing is fixed to the lower housing with screws or adhesive.

When the upper and lower housings are bonded together with adhesive, the adhesive can overflow into the developer container. In this case, adhesive that has set in the developer container can, inconveniently, interfere with the rotation of a stirring/conveying member that stirs and conveys developer.

SUMMARY

According to one aspect of the present disclosure, a developing device includes a developer container, a developer carrier, and a stirring/conveying member. The developer container stores developer containing toner. The developer carrier is rotatably supported on the developer container, and carries developer on its outer circumferential face. The stirring/conveying member is rotatably supported in the developer container to stir and convey the developer stored in the developer container. The developer container includes: a lower housing that has a first accommodating portion concave so as to be open at the top and a first edge portion formed in a top end portion of the first accommodating portion; and an upper housing that is arranged above the lower housing and that has a second accommodating portion concave so as to be open at the bottom and a second edge portion formed in a bottom end portion of the second accommodating portion and placed on the first edge portion. The first edge portion has a depression that extends along the first edge portion and that is open at the top, a first contact face that is formed inward of the depression, and a first opposite face that is formed outward of the depression. The second edge portion has an elevation that is inserted in the depression, a second contact face that makes contact with the first contact face, and a second opposite face that faces the first opposite face. Of the developer container, at least the depression and the elevation are bonded together with adhesive. When the first and second contact faces are in contact with each other, the first and second opposite faces face each other across a predetermined interval.

DETAILED DESCRIPTION

Figure 1:
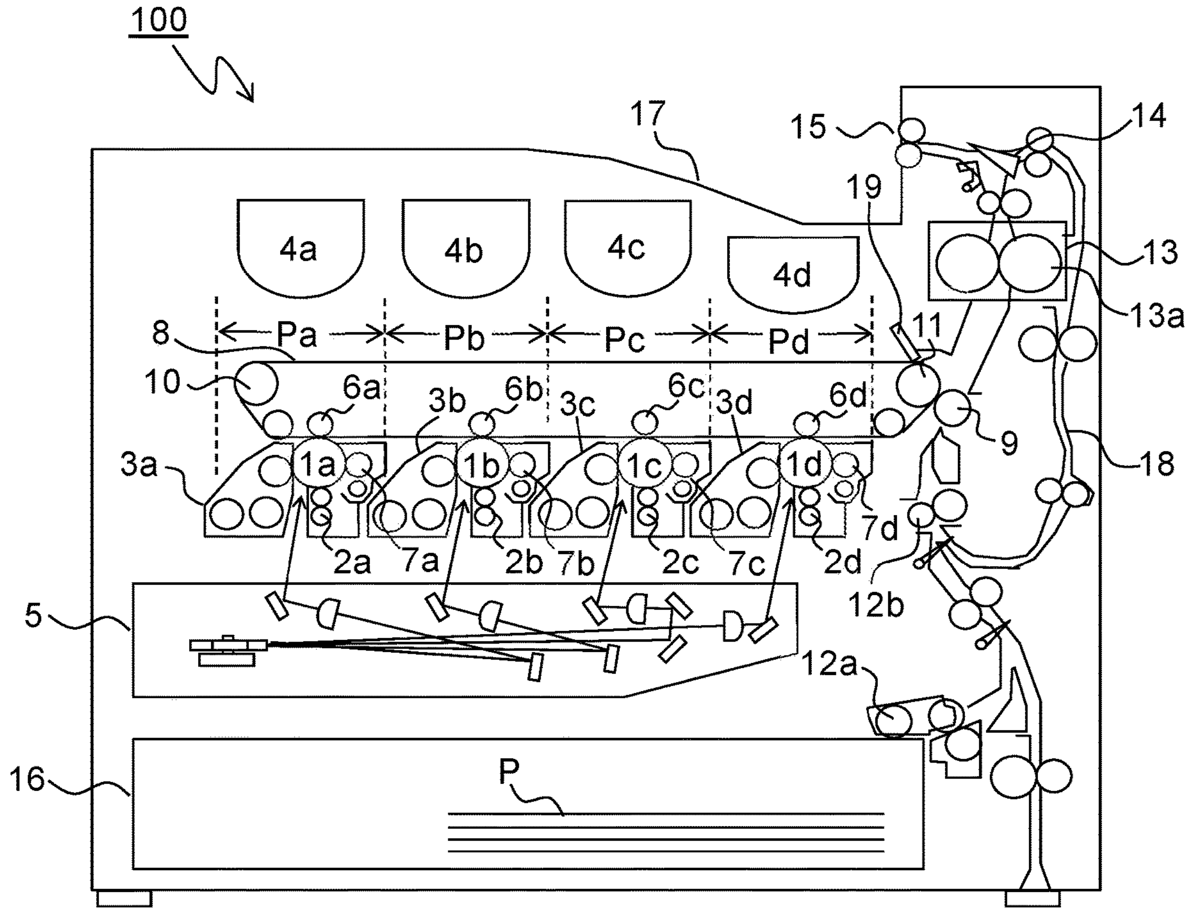
FIG. 1 is a schematic configuration diagram of a color printer mounted with a developing device according to the present disclosure.

Hereinafter, with reference to the accompanying drawings, embodiments of the present disclosure will be described. FIG. 1 is a schematic sectional view of an image forming apparatus mounted with a developing device according to one embodiment of the present disclosure. Here, a tandem-type color printer is illustrated. In the main body of the color printer 100, four image forming portions, Pa, Pb, Pc and Pd are arranged in this order from the upstream side in the conveying direction (from the left side in FIG. 1). These image forming portions Pa to Pd are provided so as to correspond to images of four different colors (yellow, magenta, cyan, and black) and sequentially form yellow, magenta, cyan, and black images through the processes of electrostatic charging, exposure, development, and transfer.

In these image forming portions Pa to Pd, photosensitive drums 1*a*, 1*b*, 1*c*, and 1*d* are respectively arranged which carry visible images (toner images) of the different colors. Furthermore, an intermediate transfer belt 8 which rotates counter-clockwise in FIG. 1 is provided adjacent to the image forming portions Pa to Pd. The intermediate transfer belt 8 is stretched around a tension roller 10 on the upstream side and a driving roller 11 on the downstream side. Downstream of the image forming portion Pd in the rotation direction of the intermediate transfer belt 8, a blade-form belt cleaner 19 is arranged so as to face the driving roller 11 across the intermediate transfer belt 8.

When image data is fed in from a host device such as a personal computer, first, a main motor (not shown) starts rotating the photosensitive drums 1*a* to 1*d*, and charging devices 2*a* to 2*d* electrostatically charge the surfaces of the photosensitive drums 1*a* to 1*d* uniformly. Next, an exposure device 5 irradiates the photosensitive drums 1*a* to 1*d* with light based on the image data to form on them electrostatic latent images reflecting the image data. A predetermined amount of two-component developer containing yellow, magenta, cyan, and black toner is charged to developing devices 3*a* to 3*d* from toner containers 4*a* to 4*d*. The developing devices 3*a* to 3*d* feed the photosensitive drums 1*a* to 1*d* with toner in the developer, which electrostatically adheres to the photosensitive drums 1*a* to 1*d*. In this way, toner images corresponding to the electrostatic latent images formed through exposure to light from the exposure device 5 are formed.

Then, by primary transfer rollers 6*a* to 6*d*, electric fields with a predetermined transfer voltage are applied between the primary transfer rollers 6*a* to 6*d* and the photosensitive drums 1*a* to 1*d*, and the yellow, magenta, cyan, and black toner images on the photosensitive drums 1*a* to 1*d* are primarily transferred to the intermediate transfer belt 8. Toner and the like left on the surface of the photosensitive drums 1*a* to 1*d* after the primary transfer is removed by cleaning devices 7*a* to 7*d*.

The transfer sheet P to which toner images are to be transferred is stored in a sheet cassette 16 arranged in a lower part of the color printer 100 and is conveyed via a sheet feeding roller 12*a* and a pair of registration rollers 12*b* to, with predetermined timing, a nip (secondary transfer nip) between a secondary transfer roller 9 provided adjacent to the intermediate transfer belt 8 and the intermediate transfer belt 8. The transfer sheet P on which the toner images have been secondarily transferred is conveyed to a fixing portion 13.

The transfer sheet P conveyed to the fixing portion 13 is heated and pressed by a pair of fixing rollers 13*a*, and thereby the toner images are fixed on the surface of the transfer sheet P to form a predetermined full-color image. The transfer sheet P on which a full-color image has been formed is directly (or after being directed to a reversing conveying passage 18 by a branch portion 14 to have images formed on both its faces) discharged to a discharge tray 17 by a pair of discharge rollers 15.

Figure 2:
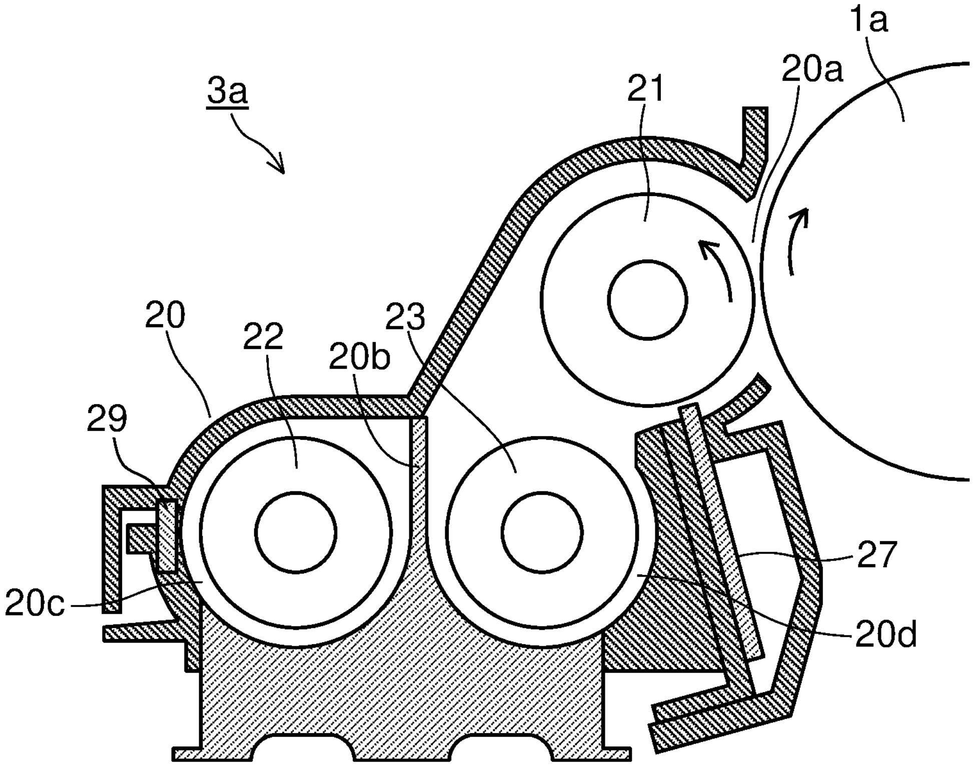
FIG. 2 is a side cross-sectional view of the developing device according to the present disclosure.

FIG. 2 is a side cross-sectional view the developing device 3*a* incorporated in the color printer 100. The following description deals with, as an example, the developing device 3*a* arranged in the image forming portion Pa in FIG. 1. The developing devices 3*b* to 3*d* arranged in the image forming portions Pb to Pd have a structure basically similar to that of the developing device 3*a*, and thus no overlapping description will be repeated.

As shown in FIG. 2, the developing device 3*a* includes a developer container 20 that stores two-component developer (hereinafter also referred to simply as developer) containing magnetic carrier and toner. The developer container 20 is partitioned into a first conveying chamber 20*c* and a second conveying chamber 20*d* by a partition wall 20*b*. In the first conveying chamber 20*c* and the second conveying chamber 20*d*, there are respectively rotatably arranged a stirring/conveying screw 22 and a feeding/conveying screw 23 which mix the toner fed from the toner container 4*a* (see FIG. 1) with magnetic carrier and which stir the mixture and thereby electrostatically charge the toner in the mixture.

Then, the developer is, while being stirred by the stirring/conveying screw 22 and the feeding/conveying screw 23, conveyed in the axial direction (the direction perpendicular to the plane of FIG. 2) and, via communication portions (not shown) formed in opposite end parts of the partition wall 20*b*, circulates between the first conveying chamber 20*c* and the second conveying chamber 20*d*. Thus, the first conveying chamber 20*c*, the second conveying chamber 20*d*, and the communication portions form a circulation passage for developer inside the developer container 20.

The developer container 20 extends obliquely to the upper right in FIG. 2. To the upper right of the feeding/conveying screw 23 in the developer container 20, a developing roller 21 is arranged. Part of an outer circumferential face of the developing roller 21 is exposed through an opening 20*a* in the developer container 20 so as to face the photosensitive drum 1*a* across a predetermined interval (developing gap). The developing roller 21 rotates counter-clockwise in FIG. 2 (rotates so as to be trailed at a position opposite the photosensitive drum 1*a*).

The developing roller 21 is composed of a cylindrical developing sleeve which rotates counter-clockwise in FIG. 2 and a magnet (not shown) which is fixed inside the developing sleeve and has a plurality of magnetic poles. Although a developing sleeve with a knurled surface is used here, any other developing sleeves can instead be used such as one with a number of recesses (dimples) formed on the surface, one with a blasted surface, or even one subjected to, in addition to knurling and recess formation, blasting or plating. The developing roller 21 is fed with, from a developing voltage power supply via a voltage control circuit (none of these are illustrated), a developing voltage having an alternating-current voltage superposed on a direct-current voltage.

To the developer container 20, a regulating blade 27 is fixed along the longitudinal direction of the developing roller 21 (in the direction perpendicular to the plane of FIG. 2). A small gap is formed between a tip end portion of the regulating blade 27 and the outer circumferential face of the developing roller 21. In this embodiment, as the regulating blade 27, a stainless steel (SUS430) magnetic blade is used.

On the side face of the first conveying chamber 20*c*, a toner concentration sensor 29 is arranged so as to face the stirring/conveying screw 22. The toner concentration sensor 29 senses the concentration of toner in the developer (the mixture ratio of toner to carrier in the developer; T/C) in the developer container 20. Used as the toner concentration sensor 29 is, for example, a magnetic permeability sensor which senses the magnetic permeability of the two-component developer containing toner and magnetic carrier inside the developer container 20. According to the concentration of toner sensed by the toner concentration sensor 29, the toner in the toner container 4*a* (see FIG. 1) is supplied through a developer supply port (not shown) into the developer container 20.

With a magnetic field generated between a regulating pole of the magnet and the regulating blade 27 in such a direction as to attract each other, a magnetic brush comprising chains of developer is formed between the regulating blade 27 and the developing roller 21. While the magnetic brush passes the regulating blade 27, its layer thickness is restricted to a desired height. Then, as the developing roller 21 rotates counter-clockwise, the magnetic brush is conveyed to a region (developing region) where the developing roller 21 and the photosensitive drum 1*a* face each other. Then, a magnetic field is applied by the main pole of the magnet and the photosensitive drum 1*a* such that these attract each other, and thus the magnetic brush makes contact with the surface of the photosensitive drum 1*a* to develop an electrostatic latent image.

When the developing roller 21 rotates further counter-clockwise, a magnetic field along the outer circumferential face of the developing roller 21 is now applied by a conveying pole of the magnet, and the magnetic brush is, together with the developer unused in toner image formation, collected onto the developing roller 21. Furthermore, by a peeling pole having a polarity different from that of the conveying pole, the magnetic brush separates from the developing roller 21 to fall into the second conveying chamber 20*d*. Then, after the developer is stirred and conveyed by the feeding/conveying screw 23, a magnetic brush is again formed on the developing roller 21 by the magnetic field of the regulating pole.

Figure 3:
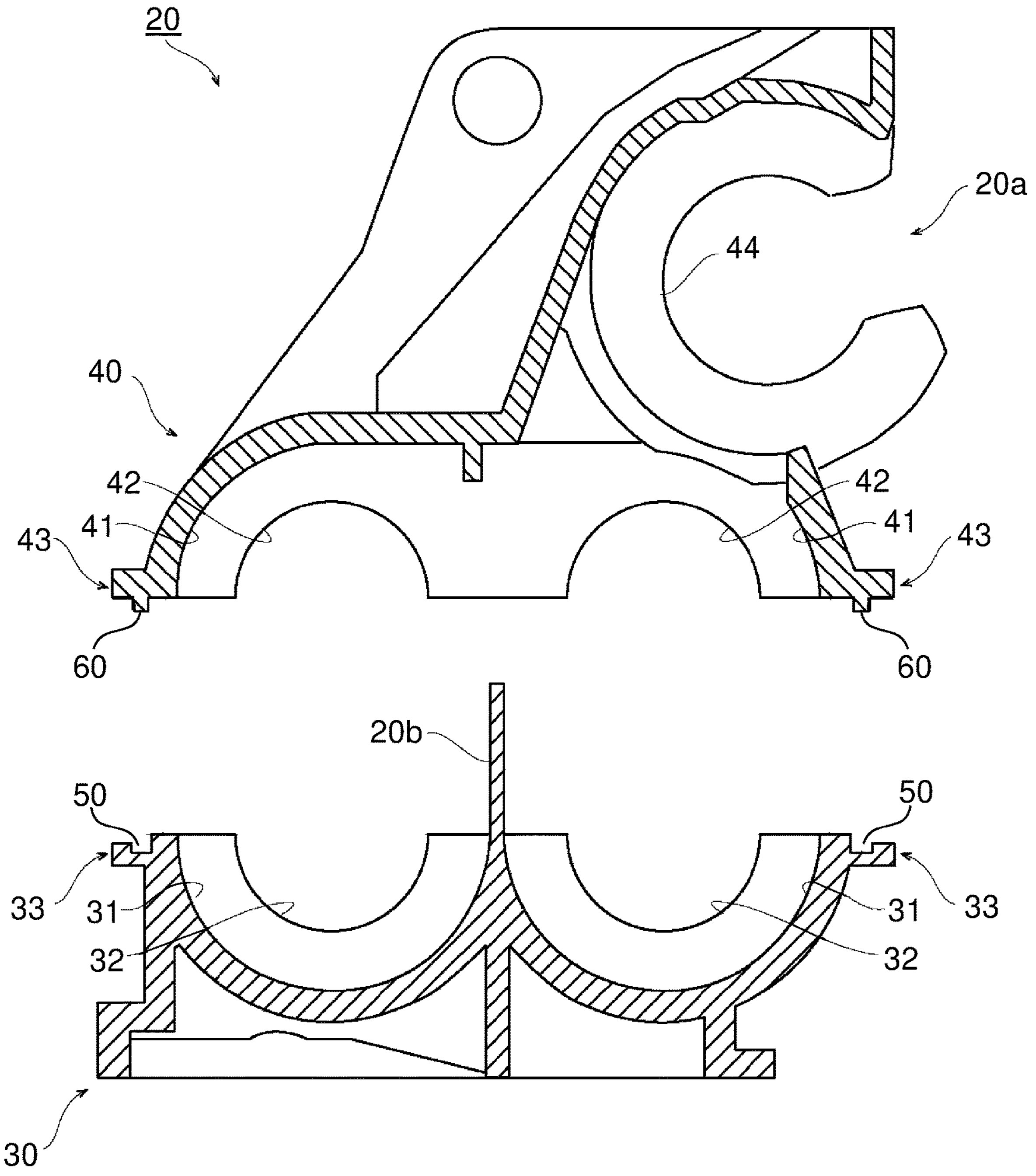
FIG. 3 is a side cross-sectional view of a developer container according to a first embodiment used in the developing device, in a state separated into a lower housing and an upper housing.
Figure 4:
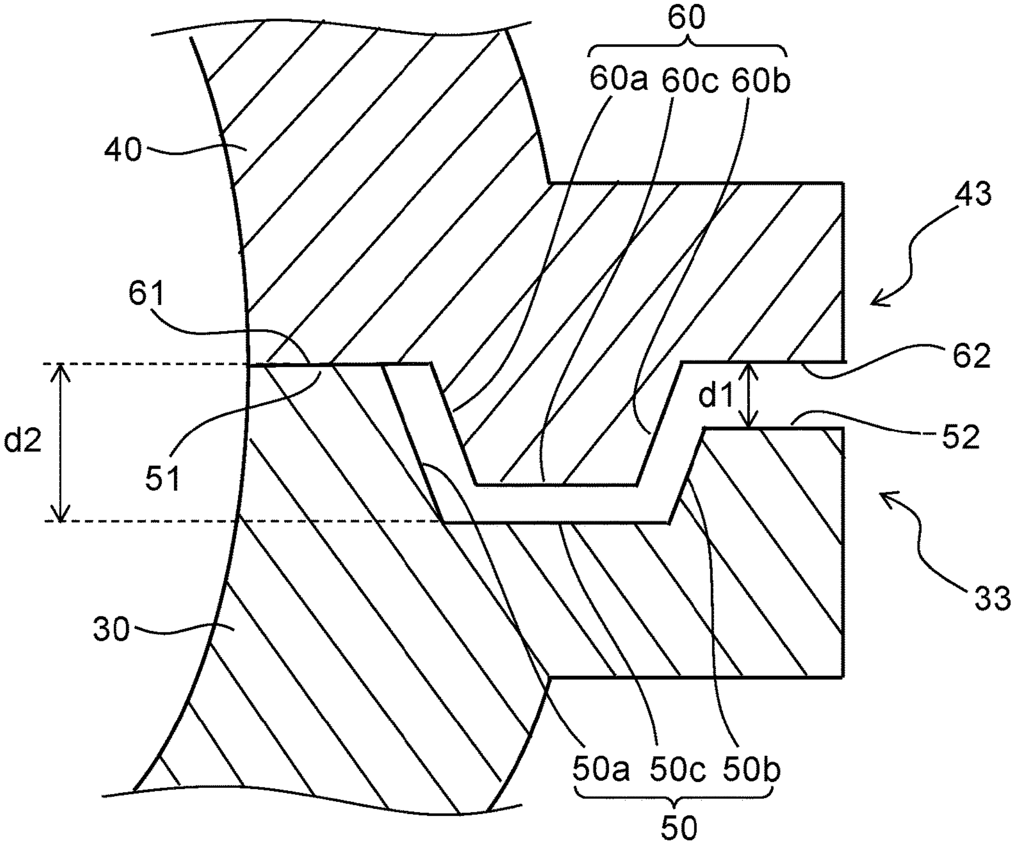
FIG. 4 is a part cross-sectional view of a first edge portion of the lower housing and a second edge portion of the upper housing in a state joined together.

FIG. 3 is a cross-sectional side view of the developer container 20 of the first embodiment used in the developing devices 3*a* to 3*d*, in a state separated into a lower housing 30 and an upper housing 40. FIG. 4 is a part cross-sectional view of a first edge portion 33 of the lower housing 30 and a second edge portion 43 of the upper housing 40 in a state joined together. As shown in FIG. 3, the developer container 20 includes the lower housing 30 and the upper housing 40. The lower housing 30 and the upper housing 40 are formed of synthetic resin by injection molding.

In the lower housing 30, a first accommodating portion 31 is formed that is concave so as to be open at the top and that extends in the longitudinal direction of the developer container 20 (the direction perpendicular to the plane of FIG. 3). The cross-section of the first accommodating portion 31 has a shape of two semicircular sections arrayed in the left-right direction, and, in the middle of it in the width direction perpendicular to the longitudinal direction, the partition wall 20*b* is formed along the longitudinal direction. On opposite sides of the partition wall 20*b*, the stirring/conveying screw 22 and the feeding/conveying screw 23 (see FIG. 2) are arranged respectively. That is, the first accommodating portion 31 constitutes the lower half of the first conveying chamber 20*c* and the second conveying chamber 20*d*.

On opposite ends of the lower housing 30 in the longitudinal direction, a pair of first bearing supporting portions 32 is formed in which are fitted bearings on the stirring/conveying screw 22 and the feeding/conveying screw 23. In a top end portion (circumferential portion) of the first accommodating portion 31, the first edge portion 33 is formed. In an upper part of the first edge portion 33 excluding the first bearing supporting portion 32, a depression 50 that is open at the top is formed so as to extend along the first edge portion 33.

In the upper housing 40, a second accommodating portion 41 is formed that is concave so as to be open at the bottom and that extends along the developer container 20 in its longitudinal direction. In opposite end parts of the upper housing 40 in the longitudinal direction, a pair of second bearing supporting portions 42 is formed in which are fitted bearings on the stirring/conveying screw 22 and the feeding/conveying screw 23. The second bearing supporting portions 42, together with the first bearing supporting portions 32, support the bearings on the stirring/conveying screw 22 and the feeding/conveying screw 23. The second accommodating portion 41 constitutes the upper half of the first conveying chamber 20*c* and the second conveying chamber 20*d*.

Over one of the second bearing supporting portions 42 (the right one in FIG. 3), a third bearing supporting portion 44 is formed in which is fitted a bearing on the developing roller 21 (see FIG. 2). To the right of the third bearing supporting portion 44, an opening 20*a* is formed. In a bottom end portion (circumferential portion) of the second accommodating portion 41, the second edge portion 43 is formed. On a bottom part of the second edge portion 43 excluding the bearing supporting portion 42, an elevation 60 is formed which extends along the second edge portion 43 so as to project downward.

As shown in FIG. 4, in a part of the first edge portion 33 inward of the depression 50 (to its left in FIG. 4), a first contact face 51 is formed. In a part of the first edge portion 33 outward of the depression 50 (to its right in FIG. 4), a first opposite face 52 is formed. The depression 50 has an inner side face 50*a* (a side face close to the first contact face 51), an outer side face 50*b* (a side face close to the first opposite face 52), and a bottom face 50*c*.

The elevation 60 is inserted in the depression 50 in the first edge portion 33 when the second edge portion 43 is placed on the first edge portion 33. In a part of the second edge portion 43 inward of the elevation 60, a second contact face 61 is formed which makes contact with the first contact face 51. In a part of the second edge portion 43 outward of the elevation 60, a second opposite face 62 is formed which faces the first opposite face 52. The elevation 60 has an inner side face 60*a* (a side face close to the second contact face 61), an outer side face 60*b* (a side face close to the second opposite face 62), and a bottom face 60*c*.

When the first edge portion 33 of the lower housing 30 is placed on the second edge portion 43 of the upper housing 40, the first contact face 51 makes contact with the second contact face 61. On the other hand, the depression 50 does not make contact with the elevation 60, and a gap is formed between the depression 50 and the elevation 60. The first opposite face 52 and the second opposite face 62 face each other across a predetermined interval.

Figure 5:
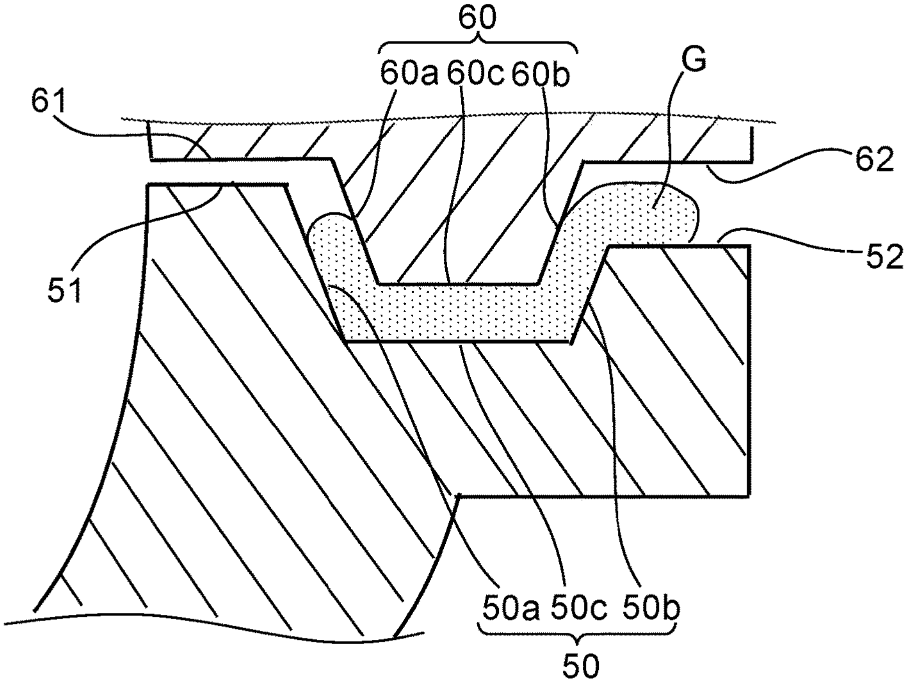
FIG. 5 is a part cross-sectional view showing how, with adhesive applied to a depression in the first edge portion, an elevation on the second edge portion is inserted in it.

FIG. 5 is a part cross-sectional view showing how, with adhesive G applied to the depression 50 in the first edge portion 33, the elevation 60 on the second edge portion 43 is inserted in it. To assemble the developer container 20, first, with the bearings on the stirring/conveying screw 22 and feeding/conveying screw 23 fitted in the first bearing supporting portions 32 in the lower housing 30, adhesive G is applied to the depression 50 in the first edge portion 33.

As shown in FIG. 5, the second edge portion 43 of the upper housing 40 is placed on the first edge portion 33 of the lower housing 30. At this time, the elevation 60 on the second edge portion 43 is inserted in the depression 50 in the first edge portion 33, and adhesive G is pushed inward and outward along the inner side face 50*a* and the outer side face 50*b* of the depression 50 as well as along the inner side face 60*a* and the outer side face 60*b* of the elevation 60. This spreads wet adhesive G across the entire surface of the depression 50 and the elevation 60, and the first edge portion 33 of the lower housing 30 and the second edge portion 43 of the upper housing 40 are firmly bonded together.

In this embodiment, as shown in FIG. 4, when the first contact face 51 inward of the depression 50 makes contact with the second contact face 61 inward of the elevation 60, the first opposite face 52 outward of the depression 50 faces the second opposite face 62 outward of the elevation 60 across a predetermined interval. That is, a space is formed between the first opposite face 52 and the second opposite face 62.

With this structure, even if an excessive amount of adhesive G is applied to the depression 50, adhesive G is likely to be pushed outward of the depression 50 (toward the first opposite face 52 and the second opposite face 62) where a larger space is available. Thus, adhesive G is less likely to overflow into the developer container 20 (toward the first contact face 51 and the second contact face 61), and this makes it possible to prevent the adhesive that has overflowed into and solidified in the developer container 20 from causing failure of the rotation of the stirring/conveying screw 22 and the feeding/conveying screw 23.

To make it easy for adhesive G to be pushed outward of the depression 50, it is preferable that the interval d1 between the first opposite face 52 and the second opposite face 62 be equal to or larger than one-half of the depth d2 of the depression 50.

The inner side face 50*a* and the outer side face 50*b* of the depression 50 as well as the inner side face 60*a* and the outer side face 60*b* of the elevation 60 are inclined faces that are inclined in directions away from each other upward. In this way, when the second edge portion 43 is placed on the first edge portion 33, the elevation 60 is easily guided into the depression 50 along the inclined faces. This eases the assembly of the developer container 20.

Figure 6:
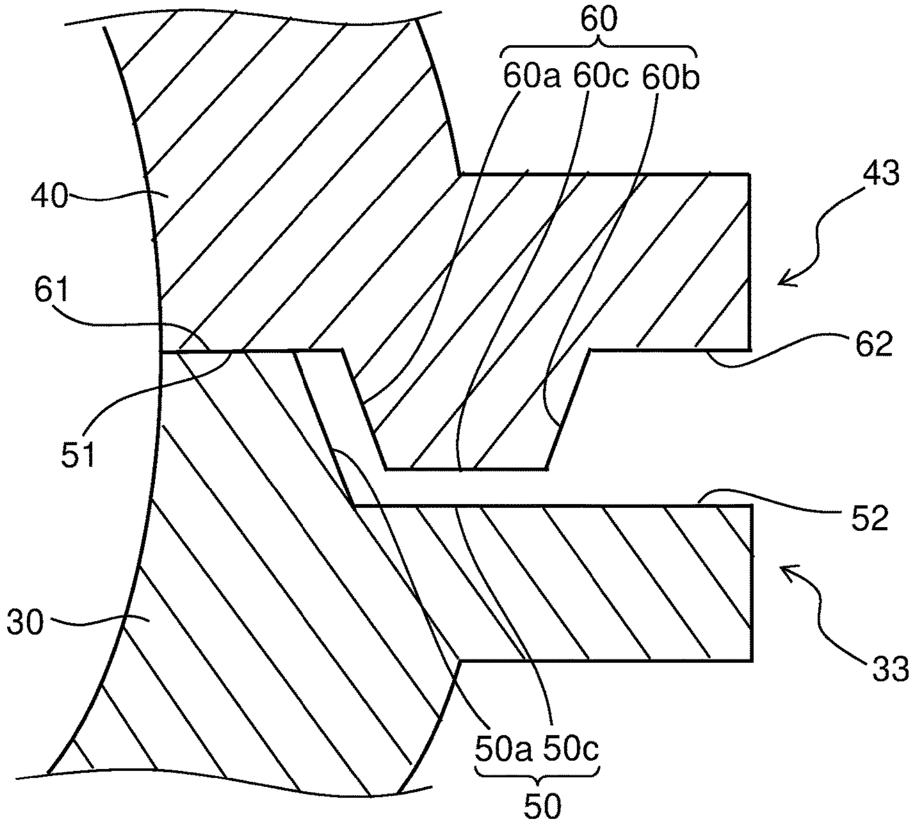
FIG. 6 is a part cross-sectional view of the developer container in a modified example of the first embodiment, showing a state where the first edge portion of the lower housing and the second edge portion of the upper housing are joined together.

FIG. 6 is a part cross-sectional view of the developer container 20 in a modified example of the first embodiment, showing a state where the first edge portion 33 of the lower housing 30 and the second edge portion 43 of the upper housing 40 are joined together. In the modified example shown in FIG. 6, the depression 50 has no outer side face 50*b*, and the bottom face 50*c* of the depression 50 is flush with the first opposite face 52. That is, the interval between the first opposite face 52 and the second opposite face 62 equals the depth of the depression 50. In other respects, the structure of the developer container 20 here is similar to that in the first embodiment shown in FIG. 4.

With the structure in FIG. 6, the space between the first opposite face 52 and the second opposite face 62 (outward of the depression 50) is even larger than in FIG. 4; thus, adhesive G pressed out by the elevation 60 spreads outward of the depression 50 even more easily.

Figure 7:
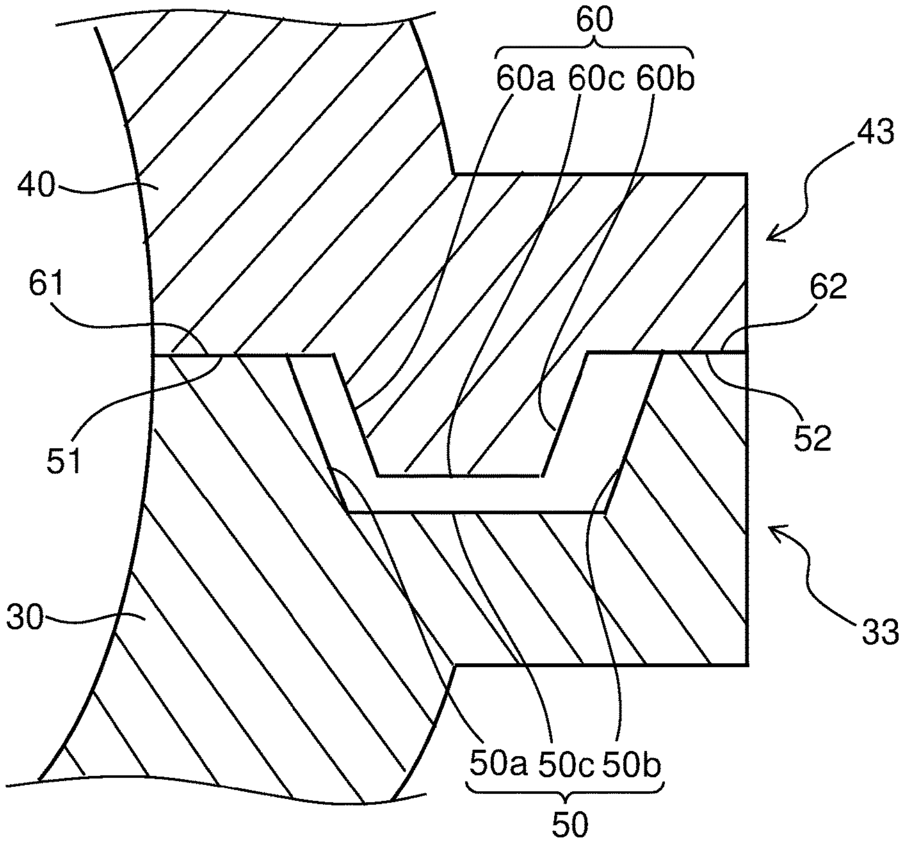
FIG. 7 is a part cross-sectional view of a developer container according to a second embodiment used in the developing device, showing a state where the first edge portion of the lower housing and the second edge portion of the upper housing are joined together.

FIG. 7 is a part cross-sectional view of a developer container 20 of a second embodiment used in the developing devices 3*a* to 3*d*, showing a state where the first edge portion 33 of the lower housing 30 and the second edge portion 43 of the upper housing 40 are joined together. In this embodiment, the first opposite face 52 of the first edge portion 33 makes contact with the second opposite face 62 of the second edge portion 43. The space between the depression 50 and the elevation 60 is larger outward of the elevation 60 (between the outer side faces 50*b* and 60*b*) than inward of the elevation 60 (between the inner side faces 50*a* and 60*a*).

With the structure in FIG. 7, even if an excessive amount of adhesive G is applied to the depression 50, adhesive G is likely to be pushed outward of the elevation 60 (between the outer side faces 50*b* and 60*b*) where a larger space is available. Thus, as in the first embodiment, adhesive G is less likely to overflow into the developer container 20, and this makes it possible to prevent adhesive that has overflowed into and solidified in the developer container 20 from causing failure of the rotation of the stirring/conveying screw 22 and the feeding/conveying screw 23.

To make it easier for adhesive G to be pushed outward of the elevation 60, it is preferable that the volume of the space outward of the elevation 60 (between the outer side faces 50*b* and 60*b*) be at least twice the volume of the space inward of the elevation 60 (between the inner side faces 50*a* and 60*a*).

The first opposite face 52 makes contact with the second opposite face 62; thus, no space is formed between the first and second edge portions 33 and 43. Thus, as seen from the side of the developer container 20, adhesive that has overflowed outward of the depression 50 is not visible, and this improves the appearance and design of the assembled developer container 20.

The embodiments described above are in no way meant to limit the present disclosure, which thus allow for many modifications and variations within the spirit of the present disclosure. For example, while the above description deals with developing devices 3*a* to 3*d* of a two-component development system using a two-component developer containing magnetic carrier and toner as shown in FIG. 2, the present disclosure is also applicable to developing devices of a one-component development system using a one-component developer containing magnetic toner or non-magnetic toner alone.

While the above embodiments deal with, as an example, a color printer 100 of a tandem type as an image forming apparatus incorporating the developing devices 3*a* to 3*d*, needless to say, the present disclosure can be applied also to, for example, monochrome or color copiers, digital multifunction peripherals, monochrome printers, and the facsimile machines.

The present disclosure is applicable to developing devices that accommodate developer containing toner and that develop latent images using the toner. Based on the present disclosure, it is possible to provide a developing device that can effectively suppress an overflow of adhesive into a developer container when the lower housing and upper housing of the developer container are fixed together by bonding, as well as to provide an image forming apparatus incorporating such a developing device.

What is claimed is:

1. A developing device comprising:

a developer container that stores developer containing toner;

a developer carrier that is rotatably supported in the developer container, the developer carrier carrying the developer on an outer circumferential face thereof;

a stirring/conveying member that is rotatably supported in the developer container to stir and convey the developer stored in the developer container, wherein the developer container includes:

a lower housing having a first accommodating portion that is concave so as to be open at a top thereof, and a first edge portion formed in a top end portion of the first accommodating portion; and an upper housing arranged above the lower housing, the upper housing having a second accommodating portion that is concave so as to be open at a bottom thereof, and a second edge portion that is formed in a bottom end portion of the second accommodating portion and that is placed on the first edge portion, the first edge portion has a depression that extends along the first edge portion and that is open at a top thereof, a first contact face that is formed inward of the depression, and a first opposite face that is formed outward of the depression, the second edge portion has an elevation that is inserted in the depression, a second contact face that makes contact with the first contact face, and a second opposite face that faces the first opposite face, at least the depression and the elevation are bonded together with adhesive, when the first and second contact faces are in contact with each other, the first and second opposite faces face each other across a predetermined interval, and when the first and second contact faces are in contact with each other the interval between the first and second opposite faces equals the depth of the depression.

2. An image forming apparatus comprising the developing device according to claim 1.

3. A developing device comprising:

a developer container that stores developer containing toner;

a developer carrier that is rotatably supported in the developer container, the developer carrier carrying the developer on an outer circumferential face thereof;

a stirring/conveying member that is rotatably supported in the developer container to stir and convey the developer stored in the developer container, wherein the developer container includes:

a lower housing having a first accommodating portion that is concave so as to be open at a top thereof, and a first edge portion formed in a top end portion of the first accommodating portion; and an upper housing arranged above the lower housing, the upper housing having a second accommodating portion that is concave so as to be open at a bottom thereof, and a second edge portion that is formed in a bottom end portion of the second accommodating portion and that is placed on the first edge portion, the first edge portion has a depression that extends along the first edge portion and that is open at a top thereof, a first contact face that is formed inward of the depression, and a first opposite face that is formed outward of the depression, the second edge portion has an elevation that is inserted in the depression, a second contact face that makes contact with the first contact face, and a second opposite face that faces the first opposite face, at least the depression and the elevation are bonded together with adhesive, and when the first and second contact faces are in contact with each other, the first and second opposite faces are in contact with each other, and the elevation and the depression are out of contact with each other, and a space between the depression and the elevation is larger outward of the elevation than inward of the elevation.

4. The developing device according to claim 3, wherein a volume of the space outward of the elevation is at least twice a volume of the space inward of the elevation.

5. An image forming apparatus comprising the developing device according to claim 3.

6. A developing device comprising:

a developer container that stores developer containing toner;

a developer carrier that is rotatably supported in the developer container, the developer carrier carrying the developer on an outer circumferential face thereof;

a stirring/conveying member that is rotatably supported in the developer container to stir and convey the developer stored in the developer container, wherein the developer container includes:

a lower housing having a first accommodating portion that is concave so as to be open at a top thereof, and a first edge portion formed in a top end portion of the first accommodating portion; and an upper housing arranged above the lower housing, the upper housing having a second accommodating portion that is concave so as to be open at a bottom thereof, and a second edge portion that is formed in a bottom end portion of the second accommodating portion and that is placed on the first edge portion, the first edge portion has a depression that extends along the first edge portion and that is open at a top thereof, a first contact face that is formed inward of the depression, and a first opposite face that is formed outward of the depression, the second edge portion has an elevation that is inserted in the depression, a second contact face that makes contact with the first contact face, and a second opposite face that faces the first opposite face, at least the depression and the elevation are bonded together with adhesive, when the first and second contact faces are in contact with each other, the first and second opposite faces face each other across a predetermined interval, and an inner side face and an outer side face of the depression, and also an inner side face and an outer side face of the elevation, are inclined faces that are inclined in directions away from each other upward.

7. An image forming apparatus comprising the developing device according to claim 6.

* * * * *